(12) United States Patent
Perronnin (10) Patent No.: US 7,680,341 B2
(45) Date of Patent: Mar. 16, 2010

(54) GENERIC VISUAL CLASSIFICATION WITH GRADIENT COMPONENTS-BASED DIMENSIONALITY ENHANCEMENT

(75) Inventor: Florent Perronnin, Saint Martin d'Hères (FR)

(73) Assignee: Xerox Corporation, Norwalk, CT (US)

( * ) Notice: Subject to any disclaimer, the term of this patent is extended or adjusted under 35 U.S.C. 154(b) by 985 days.

(21) Appl. No.: 11/418,949

(22) Filed: May 5, 2006

(65) Prior Publication Data

US 2007/0258648 A1 Nov. 8, 2007

(51) Int. Cl.
*G06K 9/62* (2006.01)
*G06K 9/46* (2006.01)
(52) U.S. Cl. .......................... 382/224; 382/159; 382/190
(58) Field of Classification Search .................. 382/159, 382/190, 224, 228
See application file for complete search history.

(56) References Cited

U.S. PATENT DOCUMENTS

2005/0105795 A1* 5/2005 Singh et al. ................. 382/160

OTHER PUBLICATIONS

Wang et al. "Vision-based Global Localization Using a Visual Vocabulary." Proceedings of the 2005 IEEE International Conference on Robotics and Automation, Apr. 18, 2005, pp. 4230-4235.*

Winn et al. "Object Categorization by Learned Universal Visual Dictionary." Tenth IEEE International Conference on Computer Vision, vol. 2, Oct. 17, 2005, pp. 1800-1807.*
Liu. "Capitalize on Dimensionality Increasing Techniques for Improving Face Recognition Grand Challenge Performance." IEEE Transactions on Pattern Analysis and Machine Intelligence, vol. 28, issue 5, May 2006, pp. 725-737.*
"A Comparison of Affine Region Detectors" K. Mikolajczyk, T. Tuytelaars, C. Schmid, A. Zisserman, J. Matas, F. Schaffalitzky, T. Kadir, L. Van Gool, *International Journal of Computer Vision*, 2005 (pp. 1-36). (Also available at http://lear.inrialpes.fr/pubs/).
"Maximum Likelihood from Incomplete Data via the $EM$ Algorithm" A. P. Dempster, N.M. Laird, D.B. Rubin, *Journal of the Royal Statistical Society. Series B (Methodological)*, vol. 39, Issue 1 (1977), pp. 1-38.
"Maximum a Posteriori Estimation for Multivariate Gaussian Mixture Observations of Markov Chains" Jean-Luc Gauvain and Chin-Hui Lee, *IEEE Transactions on Speech and Audio Processing*, vol. 2, No. 2, Apr. 1994, pp. 291-298.

(Continued)

*Primary Examiner*—Jon Chang
(74) *Attorney, Agent, or Firm*—Fay Sharpe LLP (57) ABSTRACT

In an image classification system (70), a plurality of generative models (30) correspond to a plurality of image classes. Each generative model embodies a merger of a general visual vocabulary and an image class-specific visual vocabulary. A gradient-based class similarity modeler (40) includes (i) a model fitting data extractor (46) that generates model fitting data of an image (72) respective to each generative model and (ii) a dimensionality enhancer (50) that computes a gradient-based vector representation of the model fitting data with respect to each generative model in a vector space defined by the generative model. An image classifier (76) classifies the image respective to the plurality of image classes based on the gradient-based vector representations of class similarity.

20 Claims, 4 Drawing Sheets

OTHER PUBLICATIONS

"Maximum likelihood linear regression for speaker adaptation of continuous density hidden Markov models" C. J. Leggetter and P. C. Woodland, *Computer Speech and Language* (1995) 9, pp. 171-185.

"An affine invariant interest point detector" Krystian Mikolaczyk and Cordelia Schmid, *ECCV* 2002, (15 pgs.).

"A Performance Evaluation of Local Descriptors" Krystian Mikolaczyk and Cordelia Schmid, *IEEE Transactions on Pattern Analysis and Machine Intelligence*, vol. 27, No. 10, Oct. 2005, pp. 1615-1630.

"Object Recognition from Local Scale-Invariant Features" David G. Lowe, *Proc. of the International Conference on Computer Vision*, Corfu, Sep. 1999, pp. 1-8.

"Experiments with a Gaussian Merging-Splitting Algorithm for HMM Training for Speech Recognition" Ananth Sankar, *DARPA* 1998, (6 pgs.).

"Adapted Vocabularies for Generic Visual Categorization" Florent Perronnin, Christopher Dance, Gabriela Csurka and Marco Bressan, *ECCV* 2006, to be published May 7, 2006 (12 pgs.).

\* cited by examiner

| Index | Indexed Parameter | Range (Typical) |
|---|---|---|
| c | Classes | 1...C (C~15) |
| n | Words | 1...N (N~64) |
| t | Key Patches | 1...T (T~500) |
| d | Features | 1...D (D~50) |
| j | Model Parameters | 1...J (J~3) |

GENERIC VISUAL CLASSIFICATION WITH GRADIENT COMPONENTS-BASED DIMENSIONALITY ENHANCEMENT

BACKGROUND

The following relates to the image storage and processing arts. It is described with example reference to classifying images based on the imaged subject matter or class, and is described with particular reference thereto. However, the following will find more general application in image classification, image content analysis, image archiving, image database management and searching, and so forth.

Widespread availability of digital cameras and other direct-digital imagers, and of optical scanners that convert film images, paper-printed images, or so forth into digital format, has led to generation of large numbers of digital images. Accordingly, there is interest in developing techniques for classifying images based on content, so as to facilitate image searches, image archiving, and like applications.

Techniques exist for classifying textual documents based on content. For example, clustering techniques can be applied to group documents based on similarity in word usage. Such clustering techniques in effect group together documents that share similar vocabularies as measured byword frequencies, word probabilities, or the like. These clustering-based techniques have been extended to image clustering.

However, a difficulty arises in that images are not composed of "words" that readily form a vocabulary. To address this problem, it is known to define regions, sometimes called key patches, that contain features of interest. For example, if the imaging subjects are animals or people, the key patches may focus on facial aspects such as eyes, nose, and mouth, gross anatomical aspects such as hands, feet, paws, limbs, and torso regions, and so forth. Each key patch image region is analyzed to determine a features vector or other features-based representation, which quantifies features such as spatial frequency characteristics, average intensity, and so forth. This process is repeated for each image in a set of labeled training images to produce a set of feature vectors corresponding to the key patches. The feature vectors are clustered, and the feature vectors in each cluster are averaged or otherwise statistically combined to generate visual words of a visual vocabulary. An image classifier is then trained using the training images, such that the image classifier substantially accurately classifies the training images (respective to image class labels assigned to the training images) based on comparison of feature vectors extracted from key patches of the image with the visual vocabulary. The trained classifier is then usable to classify other input images which do not have pre-assigned class labels.

Such image classification approaches advantageously leverage classification techniques developed for classifying text documents. However, computational scaling difficulties are encountered when classifying images. The skilled artisan recognizes that image processing is substantially more computationally intensive than textual processing. For example, identifying key patches in an input image involves performing pattern recognition of portions of the image, preferably including allowances for rotation, isotropic expansion or contraction, anisotropic expansion or contraction (such as image stretching), differences in overall intensity, and other variations that are typically observed from image to image. In contrast, the corresponding operation in text document classification is the word search, which is computationally straightforward.

The computational time for classifying an image typically scales approximately with the product $C \times N$, where $C$ is the number of classes and $N$ is the number of visual words in the vocabulary. As the number of image classes ($C$) is increased, the size of the visual vocabulary ($N$) sufficient to accurately classify images typically also increases. In some image classifiers, for example, it has been found that a visual vocabulary of over one-thousand visual words is needed to provide an accuracy of above 60% in classifying images into one of fifteen classes. Because $N$ generally increases with $C$, the computational time typically scales superlinearly with the number of classes ($C$). Thus, as the number of image classes increases, the increase in computational complexity can become prohibitive.

CROSS REFERENCE TO RELATED PATENTS AND APPLICATIONS

The following co-pending application is commonly owned with the present application:

Florent Perronnin, "Generic Visual Categorization Method and System", U.S. patent application Ser. No. 11/170,496 filed Jun. 30, 2005 is incorporated herein by reference in its entirety, and relates at least to techniques for classifying images based on class visual vocabularies constructed by merging a general visual vocabulary with class-specific visual vocabularies.

BRIEF DESCRIPTION

According to aspects illustrated herein, there is provided a method for classifying an image. Model fitting data are extracted for the image respective to a generative model that includes parameters relating to visual words of at least an image class-specific visual vocabulary. A higher-dimensionality representation of the model fitting data is computed that includes at least some components of a gradient of the model fitting data in a vector space defined by the parameters of the generative model. The extracting and computing are repeated for a plurality of generative models each having at least a different image class-specific vocabulary corresponding to a different class of images. The image is classified based on the higher-dimensionality representations.

According to aspects illustrated herein, there is provided an image classification system including: a plurality of generative models corresponding to a plurality of image classes, each generative model embodying at least an image class-specific visual vocabulary; a gradient-based class similarity modeler including (i) a model fitting data extractor that generates model fitting data of an image respective to each generative model, and (ii) a dimensionality enhancer that computes a gradient-based vector representation of the model fitting data with respect to each generative model in a vector space defined by the generative model; and an image classifier that classifies the image respective to the plurality of image classes based on the gradient-based vector representations.

According to aspects illustrated herein, there is provided a method for classifying an image. Model fitting data are extracted for the image respective to a generative model embodying a merger of a general visual vocabulary and an image class-specific visual vocabulary. A dimensionality of the model fitting data is increased by computing derivatives of the model fitting data in a vector space defined by parameters of the generative model. The extracting and increasing are repeated for a plurality of generative models each embodying a merger of the general visual vocabulary and a different image class-specific vocabulary for a different image class.

The image is classified based on the increased-dimensionality model fitting data.

DETAILED DESCRIPTION

Figure 1:
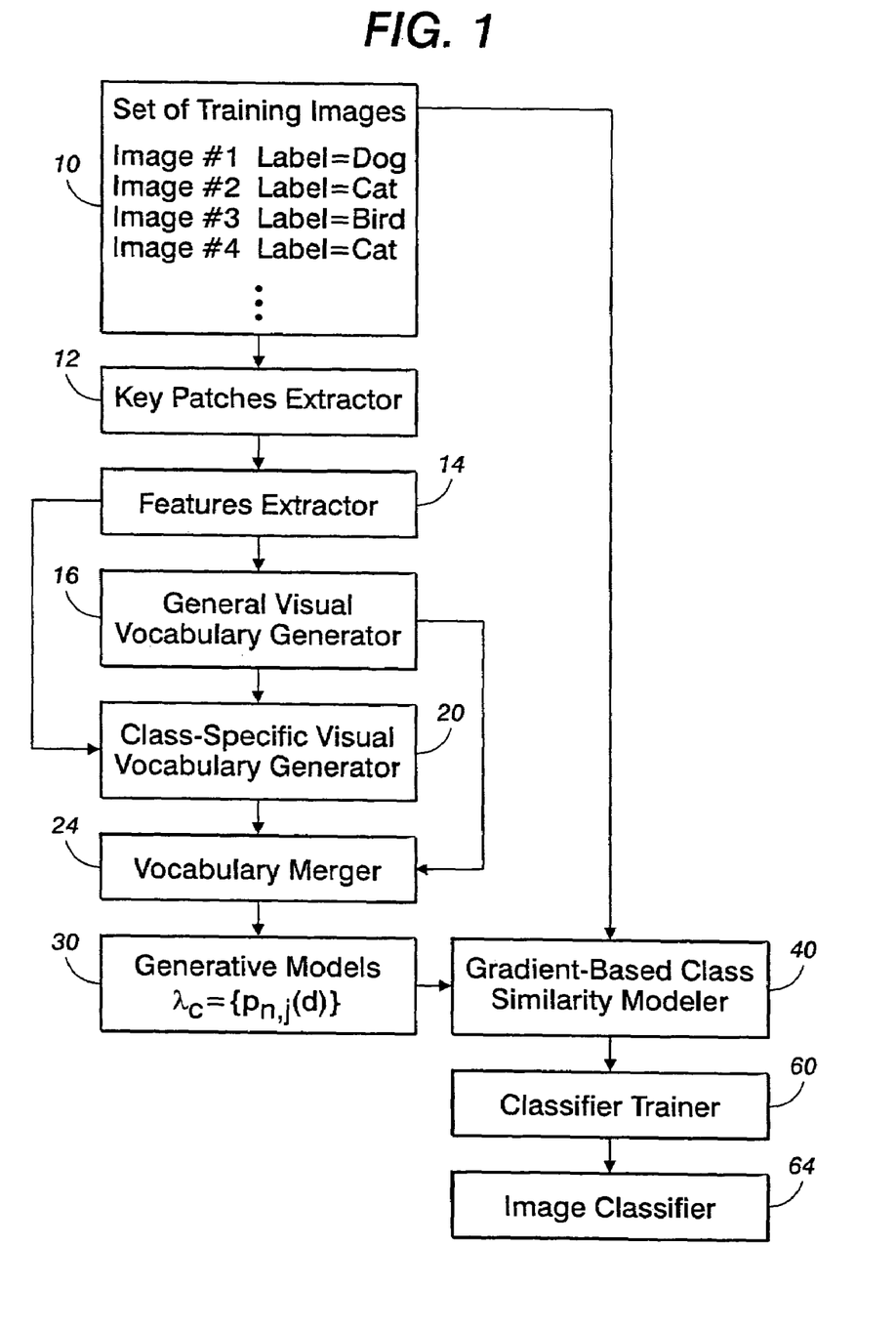
FIG. 1 diagrammatically shows an image classifier training system.

With reference to FIG. 1, an image classifier training system trains a classifier based on a set of training images 10. The training images can be in any selected format, such as JPEG, GIF, BMP, TIFF, or so forth. If appropriate, an image format converter (not shown in FIG. 1) can be used to convert the training images to a common format. The training images 10 can be black-and-white images, color images, or some combination thereof, and can have a selected resolutions (for example, measured in pixels-per-inch), sizes (for example, measured in horizontal/vertical pixel counts), aspect ratios (for example, measured in horizontal/vertical pixel count ratios), or so forth. The optional format converter (not shown in FIG. 1) may optionally resize or otherwise manipulate parameters of the training images to attain parameter uniformity across the training images. The training images 10 are selected to be representative of image content classes that the trained classifier is intended to recognize. In the illustrated embodiments, the image content classes are animal classes, such as "dog", "cat", "bird", and so forth. Each training image of the set of training images 10 is suitably labeled, annotated, or otherwise associated with a class label. Thus, for example, training image #1 is labeled with class "dog", indicating that it is an image of a dog, training images #2 and #4 are labeled with class "cat", indicating that these training images are of a cat, training image #3 is labeled with class "bird", indicating that it is an image of a bird, and so forth.

The training images are used to generate a visual vocabulary of visual words. A key patches extractor 12 identifies image regions that match up with image aspects of interest, based for example on pattern recognition, round-, corner-, or other-region feature detection, or so forth. Features can be extracted at points on a regular grid, or at random locations, or at regions of interest using the illustrated keypatch detector 12, or so forth.

In some embodiments, the key-patch extractor 12 employs a Harris affine detector technique (as described by Mikolajczyk and Schmid, in "An Affine Invariant Interest Point Detector", ECCV, 2002, and "A Performance Evaluation Of Local Descriptors", in IEEE Conference on Computer vision and Pattern Recognition, June 2003, which are incorporated herein by reference in their entirety). The Harris affine detector detects in an image a circular region of points using an iterative two-part process. In a first part, positions and scales of interest points are determined as local maxima (in position) of a scale-adapted Harris function, and as local extrema in scale of the Laplacian operator. In a second part, an elliptical (i.e., affine) region is determined, which elliptical region has a size given by the selected scale and a shape given by the eigen values of the image's second moment matrix. The first and second parts are then iterated and the elliptical region is kept only if the process converges within a fixed number of iterations. The elliptical region is then mapped to a circular region normalized according to scale, orientation, and illumination.

The described Harris affine detector technique is an example. Substantially any type of image processing or pattern recognition algorithm can be employed to identify key patch image regions in the training images 10. Examples of other suitable pattern recognition algorithms are set forth by Mikolajczyk, Tuytelaars, Schmid, Zisserman, Matas, Schaffalitzky, Kadir, Van Gool, in "A Comparison Of Affine Region Detectors", International Journal of Computer Vision, 2005 (available on the Internet at), which is incorporated herein in its entirety by reference. Alternatively, features can be extracted on a regular grid, or at random points within the image, or so forth.

A features extractor 14 extracts a features vector or other features-based representation of each key patch. Image features are typically quantitative values that summarize or characterize aspects of the key patch, such as spatial frequency content, an average intensity, color characteristics (in the case of color training images), and/or other characteristic values. In some embodiments, about fifty features are extracted from each key patch; however, the number of features that can be extracted is not limited to any particular number or type of features. In some embodiments, Scale Invariant Feature Transform (SIFT) descriptors (as described by Lowe, in "Object Recognition From Local Scale-Invariant Features", ICCV (International Conference on Computer Vision), 1999, which is incorporated herein by reference in its entirety) are computed on each key patch region. SIFT descriptors are multi-image representations of an image neighborhood, such as Gaussian derivatives computed at, for example, eight orientation planes over a four-by-four grid of spatial locations, giving a 128-dimensional vector (that is, 128 features per features vector in these embodiments). Other descriptors or feature extraction algorithms may be employed to extract features from the key patches. Examples of some other suitable descriptors are set forth by K. Mikolajczyk and C. Schmid, in "A Performance Evaluation Of Local Descriptors", Proceedings of the Conference on Computer Vision and Pattern Recognition (CVPR), Madison, Wis., USA, June 2003, which is incorporated in its entirety by reference. In the illustrated embodiments, a feature vector is employed to characterize each key patch. However, other features-based representations can be used, such as a set of features, a two- or more-dimensional array of features, or so forth.

With continuing reference to FIG. 1, a general visual vocabulary generator 16 processes the feature vectors to derive a general visual vocabulary therefrom. The general visual vocabulary generator 16 processes feature vectors from all the training images in the set of training images 10, irrespective of class label—accordingly, the resulting general visual vocabulary is characteristic of animal images in general, and is not characteristic of any particular class of animal images, such as dog images, cat images, or so forth. A suitable general visual vocabulary can be estimated by clustering the feature vectors into a number of classes corresponding to the number of visual words to be included in the general visual vocabulary. Assuming that the feature vectors may be modeled according to a probability density function, denoted $p(\ )$, clustering may be performed by maximizing the likelihood function $p(X|\lambda_g)$ with respect to the parameters $\lambda_g$ of a general visual vocabulary, where X is the set of feature vectors $x_t$ output by the features extractor 14, and t runs from 1 . . . T where T is the number of key patches extracted from the set of training images 10. Further, assuming that the feature vectors $x_t$ are independent, the likelihood function may be defined as:

$$p(X \mid \lambda_g) = \prod_{t=1}^{N} p(x_t \mid \lambda_g). \qquad (1)$$

In some embodiments, the general visual vocabulary $\lambda_g$ is a Gaussian mixture model given by:

$$p(x_t \mid \lambda_g) = \sum_{i=1}^{M} w_{i,g} p_{i,g}(x_t), \qquad (2)$$

where M is the number of mixture components, the subscript g denotes the general visual vocabulary, and the $w_{i,g}$'s are the mixture weights and are subject to the constraint: $w_{i,g} \geq 0$ for all i and $$\sum_{i=1}^{M} w_{i,g} = 1,$$

and where each component density $p_{i,g}$ is a D-variate Gaussian function of the form:

$$p_{i,g}(x_t) = \frac{1}{(2\pi)^{D/2} |\Sigma_{i,g}|^{1/2}} \exp\left\{-\frac{1}{2}(x_t - \mu_{i,g})^T \sum_{i}^{-1} (x_t - \mu_{i,g})\right\}, \qquad (3)$$

where: D is the dimension of the feature vectors $x_t$; $\mu_{i,g}$ is the D-dimensional mean vector of the i-th Gaussian of the general vocabulary; $\Sigma_{i,g}$ is the covariance matrix (of size D×D) of the i-th Gaussian of the general vocabulary; |.| is the determinant operator; and $.^T$ is the transposition operator. The parameters of the Gaussian mixture model are then $\lambda_g = \{w_{i,g}, \mu_{i,g}, \Sigma_{i,g}\}$ where the subscript i indexes the Gaussians and the subscript g denotes the general visual vocabulary.

The parameters $\lambda_g = \{w_{i,g}, \mu_{i,g}, \Sigma_{i,g}\}$ of the example Gaussian mixture model general vocabulary may, in some embodiments, be iteratively estimated using Expectation-Maximization (EM) (for background on EM see Dempster, Laird, and Rubin, "Maximum Likelihood From Incomplete Data Via The EM Algorithm", Journal of the Royal Statistical Society, vol. 39(1), pp. 1-38, 1977, which is incorporated herein by reference). A vocabulary with one Gaussian may be initialized using a set of closed formulas that estimate the parameters of the Gaussian. Subsequently the Gaussian may be split into two Gaussians by introducing a small perturbation in its mean (for background see, Ananth Sankar, "Experiments With A Gaussian Merging-Splitting Algorithm For HMM Training For Speech Recognition", Proceedings of the 1997 DARPA Broadcast News Transcription and Understanding Workshop, pp. 99-104, 1998, which is incorporated herein by reference). EM is iteratively performed until convergence. This process of Gaussian splitting and EM training may then be repeated until a desired number of Gaussians is obtained.

During the "E"-step of EM, the following occupancy probabilities $\gamma_{i,g}(t)$ are estimated for each feature vector $x_t$ and each Gaussian i of the general visual vocabulary:

$$\gamma_{i,g}(t) = p(i \mid x_t, \lambda_g) = \frac{w_{i,g} p_{i,g}(x_t)}{\sum_{j=1}^{M} w_{j,g} p_{j,g}(x_t)}. \qquad (4)$$

During the "M"-step of EM, the following parameter estimates for the general vocabulary are obtained:

$$\hat{w}_{i,g} = \frac{\sum_{t=1}^{N} \gamma_{i,g}(t)}{N}, \qquad (5)$$

$$\hat{\mu}_{i,g} = \frac{\sum_{t=1}^{N} \gamma_{i,g}(t) x_t}{\sum_{t=1}^{N} \gamma_{i,g}(t)}, \qquad (6)$$

and $$\hat{\Sigma}_{i,g} = \frac{\sum_{t=1}^{N} \gamma_{i,g}(t)(x_t - \hat{\mu}_{i,g})^T (x_t - \hat{\mu}_{i,g})}{\sum_{t=1}^{N} \gamma_{i,g}(t)}. \qquad (7)$$

More generally, it is noted that for these embodiments: each component density $p_{i,g}$ of the Gaussian mixture model corresponds to a visual word as described herein; the mixture weights $w_{i,g}$ are the relative frequencies of the visual words in the visual vocabulary; the mean parameters $\mu_{i,g}$ are the "averages" of the visual words; and the covariance matrices $\Sigma_{i,g}$ reflect the variations of the visual words around their averages.

While a Gaussian mixture model has been described for representing the general visual vocabulary, it is to be appreciated that other generative models can be employed.

With continuing reference to FIG. 1, a class-specific visual vocabulary generator 20 generates a class-specific visual vocabulary for each image class. Thus, for the example animal images classifier, the class-specific visual vocabulary generator 20 will build separate dog-specific, cat-specific, bird-specific, and so forth, visual vocabularies. For a given class, its class-specific visual vocabulary is suitably derived from that sub-set of the set of training images 10 whose images are labeled by the given class. In some embodiments the generated general visual vocabulary is used as a starting point, and is adapted to generate each class-specific visual vocabulary. This approach provides computational advantages, and also ensures that the words of the class-specific visual vocabularies correspond with words of the general visual vocabulary.

In some embodiments, the class-specific visual vocabularies are adapted from the general visual vocabulary using the Maximum A Posteriori (MAP) criterion (for more background on the MAP criterion see the following publication which is incorporated herein by reference: Gauvain and Lee, "Maximum a Posteriori Estimation for Multivariate Gaussian Mixture Observations of Markov Chains", IEEE Trans. on Speech and Audio Processing, Vol. 2, No. 2, April 1994). In these embodiments, the adapted class-specific visual vocabulary for each class is computed using the general visual vocabulary and the feature vectors extracted from training images of the class. The criterion to be maximized in MAP is:

$$p(\lambda_a|X) \propto p(X|\lambda_a) \cdot p(\lambda_a) \qquad (8)$$

where $\lambda_a$ is the set of parameters of the adapted class-specific visual vocabulary. The difference between MAP and maximum likelihood (ML) estimation lies in the assumption of an appropriate prior distribution $p(\lambda_a)$ of the parameters to be estimated. In some embodiments, the parameters of the prior densities $p(\lambda_a)$ are the parameters of the general vocabulary $\lambda_g = \{w_{i,g}, \mu_{i,g}, \Sigma_{i,g}\}$. That is, the seed visual vocabulary used to initialize EM for the MAP determination of the adapted class-specific visual vocabularies is the general visual vocabulary. During the "E"-step, the occupancy probabilities $\gamma_{i,a}(t)$ are computed for each Gaussian:

$$\gamma_{i,a}(t) = p(i \mid x_t, \lambda_a) = \frac{w_{i,a} p_{i,a}(x_t)}{\sum_{j=1}^{M} w_{j,a} p_{j,a}(x_t)}. \qquad (9)$$

During the "M"-step, the following estimates for the parameters $\lambda_a$ of the adapted class-specific visual vocabulary are obtained:

$$\hat{w}_{i,a} = \frac{\tau + \sum_{t=1}^{N} \gamma_{i,a}(t)}{M\tau + N}, \qquad (10)$$

$$\hat{\mu}_{i,a} = \frac{\tau \mu_{i,g} + \sum_{t=1}^{N} \gamma_{i,a}(t) x_t}{\tau + \sum_{t=1}^{N} \gamma_{i,a}(t)}, \qquad (11)$$

and $$\hat{\Sigma}_{i,a} = \frac{\tau \sum_{i,g} + \sum_{t=1}^{N} \gamma_i(t)(x_t - \hat{\mu}_{i,a})^T (x_t - \hat{\mu}_{i,a}) + \tau(\mu_{i,g} - \hat{\mu}_{i,a})(\mu_{i,g} - \hat{\mu}_{i,a})^T}{\tau + \sum_{t=1}^{N} \gamma_i(t)}, \qquad (12)$$

where $\tau$ is a "relevance factor" which keeps a balance between the prior information brought by the parameters $\lambda_g$ of the general visual vocabulary, and the new information brought by the class-exclusive training samples $x_t$ used for the adaptation. (For example, when adapting the general visual vocabulary to form the example "dog"-specific visual vocabulary, the class-exclusive training samples $x_t$ used for the adaptation are only those images of the set of training images 10 that are labeled as "dog" images).

Storage for the adapted class-specific visual vocabularies is optionally reduced by saving only those Gaussians (i.e., visual words) that have significantly changed adapted values compared to the general vocabulary. The significance of the change may be measured using various metrics such as the divergence, the Bhattacharya distance, or the overlap. In alternate embodiments, the adapted vocabularies may be computed using Maximum Likelihood Linear Regression (MLLR), as for example disclosed by Leggetter and Woodland, "Maximum Likelihood Linear Regression for Speaker Adaptation of Continuous Density Hidden Markov Models", Computer Speech and Language, issue 9, pp. 171-185, 1995, which is incorporated herein by reference. In this alternate embodiment, an affine transformation is applied to all components of the adapted class-specific visual vocabularies. Storage required for the adapted class-specific visual vocabularies may be reduced using this alternate embodiment if the number of parameters of the transformation is smaller than the number of Gaussian parameters corresponding to the adapted class-specific visual vocabularies.

With continuing reference to FIG. 1, a vocabularies merger 24 generates the visual vocabulary for each class by merging the general visual vocabulary and the adapted class-specific visual vocabulary. The merger 24 is suitably accomplished in some embodiments by concatenating the visual words of the general visual vocabulary and the visual words of the class-specific visual vocabulary. In embodiments in which the class-specific visual vocabulary is adapted from the general visual vocabulary, there is a one-to-one correspondence between the visual words of the general and class-specific visual vocabularies. Accordingly, the merged vocabulary will have twice as many words as in either the general visual vocabulary alone or class-specific visual vocabulary alone. For example, if the general visual vocabulary contained 32 visual words, then each adapted class-specific visual vocabulary will contain a corresponding (adapted) 32 visual words, and the merged class visual vocabulary will therefore contain 32+32=64 visual words.

In embodiments in which the visual words are represented using Gaussians, the merging of the general visual vocabulary and each adaptive class-specific visual vocabulary also involves adjusting the weight parameter of the Gaussians to reflect the vocabulary size having doubled. This weight adjustment is suitably performed by, for example, dividing the frequency of words of the Gaussians by, for example, its relative frequency of occurrence; the other parameters of the Gaussians remain unchanged (e.g., mean and covariance parameters). The set of parameters of the class visual vocabulary of visual words for class c is denoted $\lambda_c$ 30, which is also called the generative model for class c.

A Gaussian mixing model is used as the generative model in the embodiments described herein. This model includes, for each visual vocabulary word indexed n, a weight $w_n$, a set or vector of Gaussian mean values $\mu(d)$ of dimensionality D (where D is the number of features in a features vector), and a set of Gaussian covariance matrices $\Sigma(d)$ each of which is a D×D matrix.

More generally, the generative model (which may or may not be a Gaussian mixture model) can be represented as $\lambda_c = \{p_{n,j}(d)\}$ where n indexes the visual words and j indexes the parameters for each word. For the Gaussian mixing model, j=1 suitably corresponds to the weighting parameter type $w_n$, j=2 suitably corresponds to the mean parameter type $\mu(d)$, and j=3 suitably corresponds to the Gaussian covariance matrices parameter type $\Sigma(d)$. In other generative models, other parameter types may be used, at least some of which will typically depend upon the dimensions d of the features vectors $x_t$.

Figure 2:
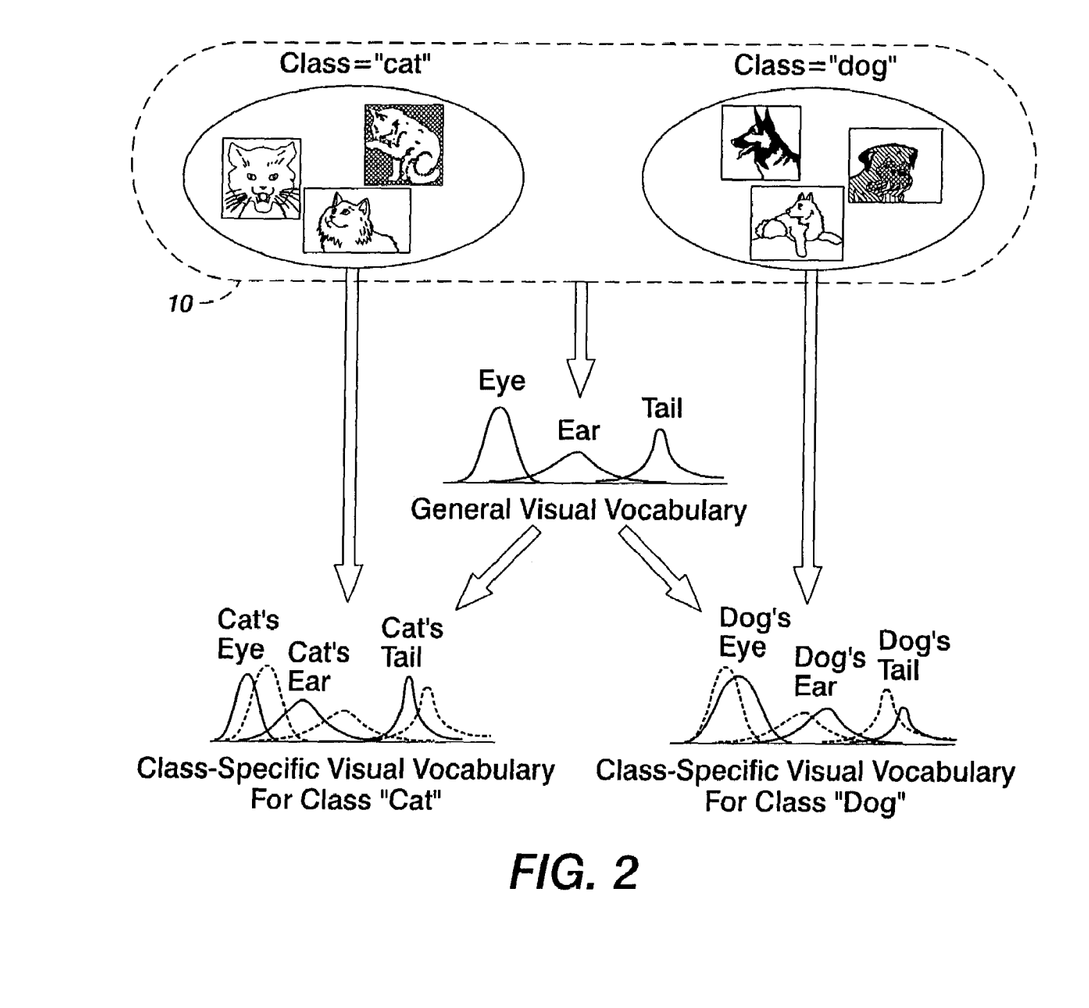
FIG. 2 diagrammatically shows generation of two class visual vocabularies.

With continuing reference to FIG. 1 and with brief reference to FIG. 2, the generation of the general and class-specific visual vocabularies is illustrated diagrammatically. In FIG. 2, the set of training images 10 is diagrammatically shown, with the images labeled "dog" and the images labeled "cat" segregated out into separate sub-sets of images. The whole set of training images 10 is used by the general visual vocabulary generator 16 to produce the general visual vocabulary diagrammatically depicted in FIG. 2 by showing Gaussian representations for the eye, ear, and tail visual words. The general visual vocabulary is adapted with reference to the "cat" sub-set of training images to produce the cat-specific visual vocabulary, which includes both the Gaussians of the general visual vocabulary and the adapted Gaussians that have been adapted to the cat images. The general visual vocabulary is adapted with reference to the "dog" sub-set of training images to produce the dog-specific visual vocabulary, which includes both the Gaussians of the general visual vocabulary and the adapted Gaussians that have been adapted to the dog images. The process is repeated for the "bird" class (not shown in FIG. 2) and for the other image classes.

The inventor has found that using class visual vocabularies which include visual words characteristic of general images and also visual words characteristic of class-specific images (that is to say, using merger class vocabularies each of which merges the general visual vocabulary and a class-specific visual vocabulary) provides a more discerning basis for training and using an image classifier as compared with training such a classifier using only a general visual vocabulary. Qualitatively, this can be understood as follows. When an image of a particular class is compared with the visual vocabulary for that class, the features-based representation of the image can be expected to more closely match the class-specific vocabulary words of the class vocabulary versus the general vocabulary words of the class vocabulary. On the other hand, when the image is compared with the visual vocabularies of other classes, the features-based representation of the image can be expected to more closely match the general vocabulary words of those other class vocabularies versus the class-specific vocabulary words of those other class vocabularies.

Class visual vocabularies or generative models that are mergers of general and class-specific visual vocabularies have been found to be especially effective for classifying images. In effect, such a merged class visual vocabulary provides a natural comparison of how well an image satisfies a class (for example, the "dog" class) compared with how well the image satisfies a general image (for example, an image of any animal). However, it is also contemplated to employ class visual vocabularies or generative models that embody only class-specific visual words, such class visual vocabularies also being expected to be more discriminating in image classification than a general visual vocabulary alone.

In one approach for applying the class visual vocabularies or generative models, model fitting data is computed respective to each generative model that is indicative of how closely the input image matches the class-specific visual words compared (e.g., ratioed) with how closely the input image matches the general visual words. One suitable model fitting data representation is, for example, $\log(p(X|\lambda_a) - \log(p(X|\lambda_g))$ where X denotes the set of feature vectors extracted from the image (e.g., $X=\{x_t\}$, $t=1 \ldots T$), $\lambda_a$ denotes the parameters of the adapted class-specific visual vocabulary, $\lambda_g$ denotes the parameters of the general vocabulary, $p()$ denotes a conditional probability, and logo denotes a logarithm (such as, for example, a natural logarithm or a base-ten logarithm). For an image belonging to the class c, it is expected that $\log(p(X|\lambda_a))$ will be larger than $\log(p(X|\lambda_g))$, whereas for an image belonging to another class it is expected that $\log(p(X|\lambda_g))$ will be larger than $\log(p(X|\lambda_a))$. Other model fitting data representations can be used, such as $\log(p(X|\lambda_c))$ where $\lambda_c$ denotes parameters of the class visual vocabulary (which in some embodiments is a merger of the class-specific visual vocabulary $\lambda_a$ and the general vocabulary $\lambda_g$).

However, if the number of classes is large, the model fitting data for several most similar classes may be quantitatively close to one another, making it difficult to train a classifier to accurately identify from amongst a large number of classes. One solution is to increase the size of the vocabulary to provide more data points to distinguish between close likelihood measures—however, this can result in undesirably difficult computational complexity in the case of a large number of classes.

Figure 3:
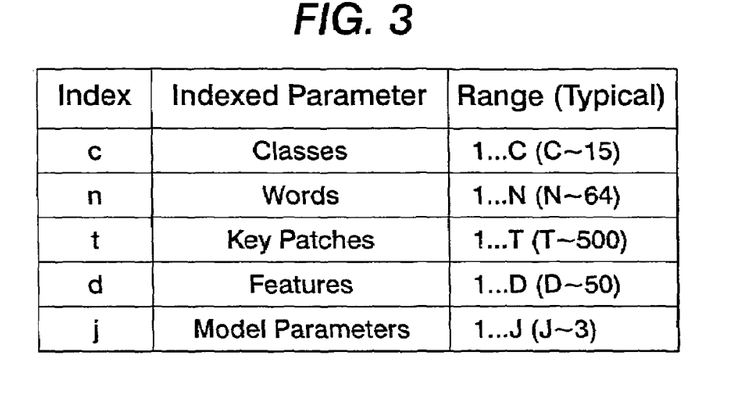
FIG. 3 tabulates certain parameters used in the image classification.

With reference to FIG. 3, the computational issues, as well as certain notation used herein, are summarized. The classes are indexed by c, which runs from 1 to C. That is, there are C classes. The words of the visual vocabulary for each class are indexed by n, which runs from 1 to N. Thus, there are N words in each class visual vocabulary. For a class visual vocabulary formed by merger of general and class-specific visual vocabularies, N/2 words are general visual words and N/2 words are class-specific visual words. The image to be classified is characterized by extracting key patch image regions indexed by t, which runs from 1 to T. Thus, there are T extracted key patches. If a single feature vector is derived from each key patch, then the image is characterized by T feature vectors. Each feature vector includes a set of features indexed by d, which runs from 1 to D. Thus, D is the number of different types of extracted features in the feature-based image representation. The generative model may use more than one type of parameter to characterize each visual word, and these different types of parameters are indexed by j which runs from 1 to J. For example, the Gaussian mixture model characterizes each visual word by a weight (j=1), a mean μ (j=2), and a covariance matrix Σ (j=3), so that J=3 for the Gaussian mixture model.

The model fitting data provides, by itself, relatively little data for an image classifier to operate on. For example, using a representation such as $\log(p(X|\lambda_c))$ results in a single conditional probability data point for each class. Thus, the number of data points provided is C, corresponding to the number of classes. The feature vectors set X and the generative models $\lambda_c$, on the other hand, are of substantially higher dimensionality. X has D×T dimensions while $\lambda_c$ has of order N×D dimensions, assuming that at least one parameter type (such as the mean $\mu_n(d)$ in the Gaussian mixture model) depends upon the D dimensions of the feature vectors $x_t$.

Figure 4:
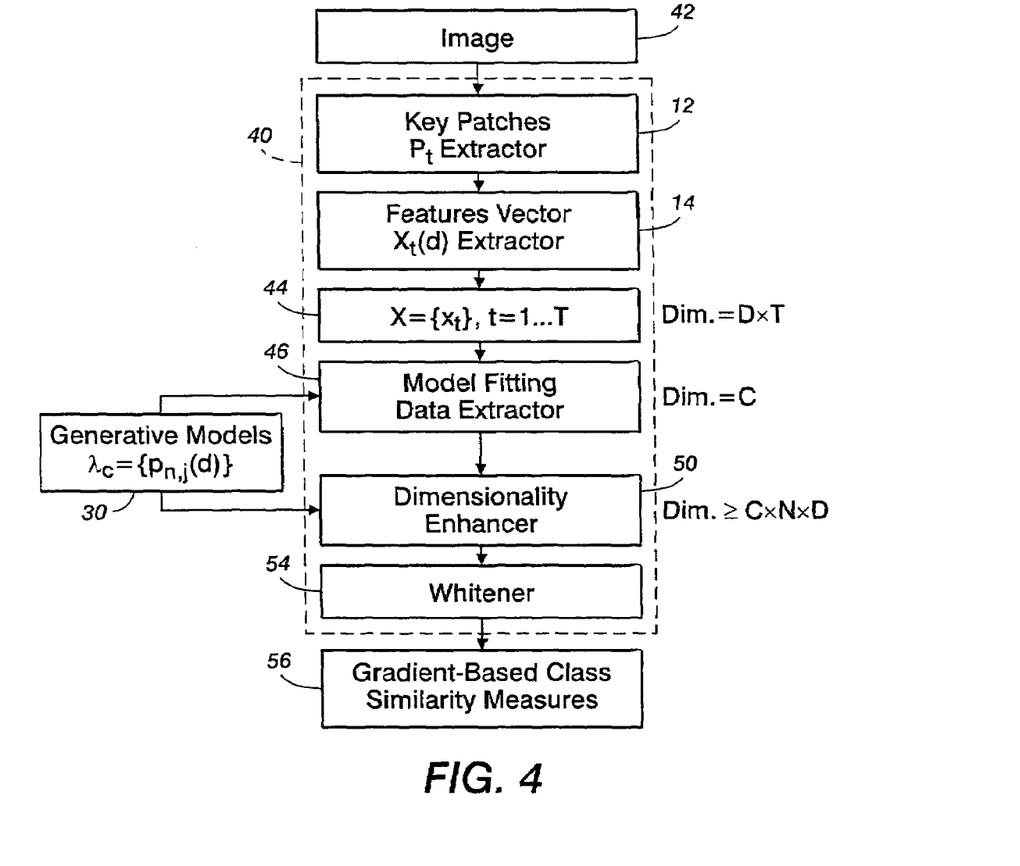
FIG. 4 diagrammatically shows a gradient-based class similarity modeler.

Accordingly, with returning reference to FIG. 1 and with further reference to FIG. 4, an approach is set forth which provides increased dimensionality for input to the image classifier, thus enabling the image classifier to be more discerning amongst different image classes. An input image 42, which may be either a training image or an image to be classified, is input to a gradient-based class similarity modeler 40. The key patches extractor 12 and the features vector extractor 14 are applied to the input image 42 in the same way as previously described for the process of extracting visual vocabularies from the set of training images 10. (Indeed, as indicated by using common reference numbers 12, 14 in FIGS. 1 and 4, the software modules or other implementations of the key patches extractor 12 and the features vector extractor 14 used in deriving the visual vocabularies are also optionally invoked by the gradient-based class similarity modeler 40). The output of the key patches extractor 12 and the features vector extractor 14 is a set of feature vectors X 44, where $X=\{x_t\}$, $t=1 \ldots T$, and T denotes the number of extracted key patches if a single features vector $x_t$ is extracted from each key patch $P_t$.

A model fit of each generative model $\lambda_c$ with the set of feature vectors X 44 is extracted by a model fitting data extractor 46. In a suitable approach, the model fitting data is represented as $\log(p(X|\lambda_c))$, although other representations such as $\log(p(X|\lambda_a)-\log(p(X|\lambda_g))$ may be used. As noted in FIG. 4, the output of the model fitting data extractor 46 applied for each class c=1 ... C is a set of image comparisons having dimensionality C corresponding to the number of image classes. This dimensionality C is typically relatively low.

Accordingly, a dimensionality enhancer 50 enhances the dimensionality of the extracted model fitting data by computing gradient components in a vector space defined by the parameters of the generative model. Using gradient components to increase dimensionality is computationally efficient, and the gradient components have intuitive meaning as indicating sensitivity of the model fitting to various parameters of the generative models. The additional information extracted by gradient component computation is therefore not redundant, but rather provides additional data points for training and applying an image classifier. If the model fitting data output by the model fitting data extractor 46 is $\log(p(X|\lambda_c))$, and the dimensionality enhancer 50 computes all gradient components, then the output of the dimensionality enhancer 50 is suitably written as:

$$V_c = \frac{1}{T} \cdot \nabla_{\lambda_c} \log(p(X|\lambda_c)), \qquad (13)$$

where T is the number of feature vectors in the set of feature vectors X 44, $\lambda_c$ is the generative model for image class c, $\nabla_{\lambda_c}$ denotes the gradient in the vector space defined by the generative model $\lambda_c$, and $V_c$ denotes the gradient vector for class c. As noted in FIG. 4, the gradient vectors $V_c$ provide substantially enhanced dimensionality of at least C×N×D dimensions, assuming that gradient components are computed for at least one generative model parameter that is a vector of dimension D. Referring back to the example typical values given in FIG. 3 (C=15, N~64, D~50), the set of image comparisons have dimensionality C=15 while the set of enhanced dimensionality gradient vectors $V_c$ have dimensionality C×N×D=15×64×50=48,000.

For the example of the generative model being a Gaussian mixture model, the class visual vocabularies are represented by parameters of the generative model $\lambda_c = \{w_n, \mu_n, \Sigma_n\}$, n=1 ... N, where the $w_n$ parameters are mixture weights, the $\mu_n$ parameters are means, and the $\Sigma_n$ parameters are covariance matrices. In the following, the covariance matrices $\Sigma_n$ are assumed to be diagonal and are represented by the diagonal values $\sigma_n^2 = \text{diag}(\Sigma_n)$. The d-th feature of the feature vectors $x_t$ is represented by $x_t(d)$, where d=1 ... D indexes the feature dimensions of the feature vectors $x_t$. Similarly, the mean and covariance generative model parameters $\mu_n$ and $\sigma_n$, respectively, have dimensionality D with $\mu_n(d)$ and $\sigma_n(d)$ representing the d-th dimension of vectors $\mu_n$ and $\sigma_n$, respectively.

Assuming independence of the feature vectors $x_t$ making up the set of feature vectors X 44, the image comparisons can be written as follows:

$$\log(p(X|\lambda_c)) = \sum_{t=1}^{T} \log(p(x_t|\lambda_c)), \qquad (14)$$

with $$p(x_t|\lambda_c) = \sum_{n=1}^{N} w_n p_n(x_t). \qquad (15)$$

The weighting parameters $w_n$ are subject to the following constraints:

$$w_n \geq 0, \forall n \text{ and } \sum_{n=1}^{N} w_n = 1. \qquad (16)$$

The components $p_n$ are given by:

$$p_n(x_t) = \frac{1}{(2\pi)^{D/2} \cdot |\Sigma_n|^{1/2}} \cdot \exp\left(-\frac{1}{2}(x-\mu_n)^T \cdot \Sigma_n^{-1} \cdot (x-\mu_n)\right), \qquad (17)$$

where $.^T$ is the transposition operator and $|.|$ denotes the determinant operator. The derivatives or gradient components of gradient vector $V_c$ of Equation (13) along dimensions of the vector space defined by the weighting parameters $w_n$ are suitably given by:

$$\frac{1}{T}\frac{\partial}{\partial w_n}\log(p(X|\lambda_c)) = \frac{1}{T} \cdot \sum_{t=1}^{T} \frac{\gamma_t(n)}{w_n}, \qquad (18)$$

where $\gamma_t(n)$ is the occupation probability, given by:

$$\gamma_t(n) = \frac{w_n \cdot p_n(x_t)}{\sum_{k=1}^{N} w_k \cdot p_k(x_t)}. \qquad (19)$$

Similarly, the derivatives or gradient components of gradient vector $V_c$ of Equation (13) along dimensions of the vector space defined by the mean parameters $\mu_n(d)$ are suitably given by:

$$\frac{1}{T}\frac{\partial}{\partial \mu_n(d)}\log(p(X|\lambda_c)) = \frac{1}{T} \cdot \sum_{t=1}^{T} \gamma_t(n) \times \left[\frac{x_t(d) - \mu_n(d)}{\sigma_n(d)^2}\right]. \qquad (20)$$

The derivatives or gradient components of gradient vector $V_c$ of Equation (13) along dimensions of the vector space defined by the covariance parameters represented by diagonal values $\sigma_n(d)$ are suitably given by:

$$\frac{1}{T}\frac{\partial}{\partial \sigma_n(d)}\log(p(X|\lambda_c)) = \qquad (21)$$

$$\frac{1}{T} \cdot \sum_{t=1}^{T} \gamma_t(n) \times \left[\frac{(x_t(d) - \mu_n(d))^2}{\sigma_n(d)^3} - \frac{1}{\sigma_n(d)}\right].$$

Equations (19)-(21), applied over the visual word index range n=1 ... N and over the features vector dimensions range d=1 ... D set forth the components of the gradient vector $V_c$. As these various gradient components may have substantially different dynamic ranges, a whitener 54 is optionally applied to whiten the vector components, for example by normalizing the variances to unity. The gradient components computed by the dimensionality enhancer 50, optionally including the whitening optionally performed by the whitener 54, are a set of gradient-based class similarity measures 56 arranged as vectors or so forth.

More generally, the output 56 of the dimensionality enhancer 50 can be a concatenation or set of gradient components set forth in Equations (19)-(21), or can be a sub-set of the gradient components. For example, in some embodiments the gradient components along only dimensions of the vector space defined by the mean parameters $\mu_n(d)$ of the generative model $\lambda_c$ 30 are computed. In some embodiments, the gradient components along only dimensions of the vector space defined by the diagonals $\sigma_n(d)$ of the covariance parameters of the generative model $\lambda_c$ 30 are computed. In some embodiments, the gradient components along only dimensions of the vector space defined by the mean parameters $\mu_n(d)$ and by the diagonals $\sigma_n(d)$ of the covariance parameters of the generative model $\lambda_c$ 30 are computed. In some embodiments, the complete gradient including gradient components along dimensions of the vector space defined by the weights $w_n$, the mean parameters $\mu_n(d)$, and by the diagonals $\sigma_n(d)$ of the covariance parameters of the generative model $\lambda_c$ 30 are computed.

With returning reference to FIG. 1, the gradient-based class similarity modeler 40 is applied to each of the training images of the set of training images 10. The result is a set of gradient-based class similarity measures with class labels. A classifier trainer 60 produces a trained image classifier 64 trained using these class-labeled gradient-based class similarity measures. The classifier 64 can be, for example, a support vector machine (SVM) classifier, although substantially any type of classifier can be used.

Figure 5:
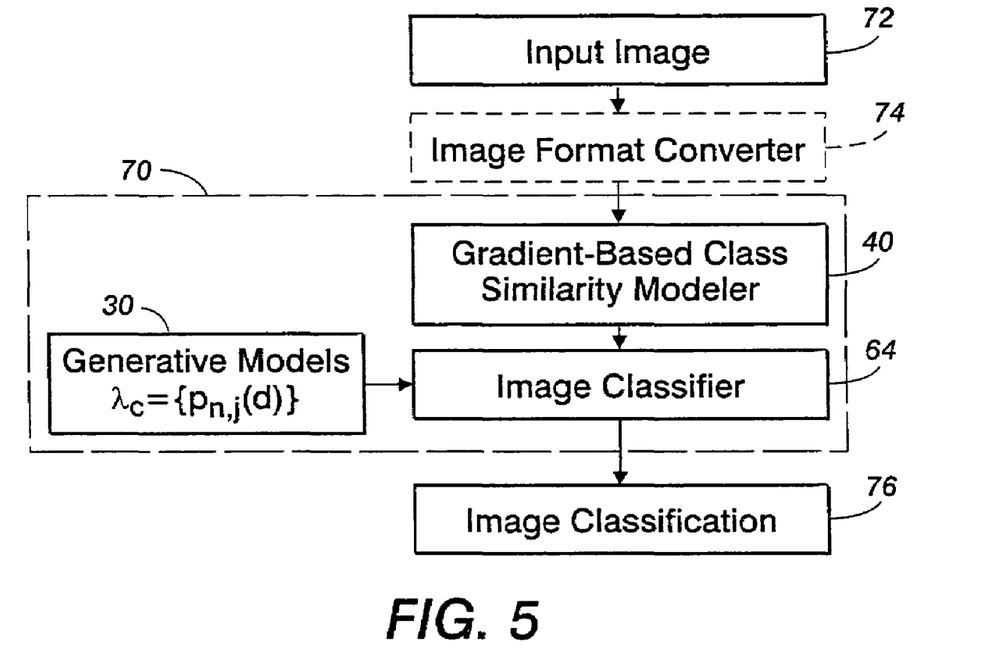
FIG. 5 diagrammatically shows an image classification system including the gradient-based class similarity modeler of FIG. 4 and generative models and a trained image classifier produced by the image classifier training system of FIG. 1.

With reference to FIG. 5, the gradient-based class similarity modeler 40, the trained image classifier 64, and the generative models $\lambda_c$ 30 are suitably used to form an image classification system 70 for classifying input images of a priori unknown classification. An input image 72 is received for classification. If appropriate, an image format converter 74 is optionally applied to convert the input image 72 into a format compatible with the gradient-based class similarity modeler 40 of FIG. 4. For example, if the key patches extractor 12 and features extractor 14 are constructed to operate on TIFF images, but the input image 72 is in a JPEG format, then the image format converter 74 suitably performs a JPEG-to-TIFF format conversion. The optional image format converter 74 optionally also adjusts image resolution or other image parameters. The input image 72, optionally converted in format by the converter 74, is then processed by the gradient-based class similarity modeler 40 of FIG. 4 to produce a set of gradient-based similarity measures, which are then input to the trained image classifier 64 which determines an image classification 76 for the input image 72.

The image classification system 70 finds application in various tasks, such as searching a database of images to find images of a particular type (e.g., searching a database of animal images to find images of dogs). The image classification system 70 can also be used for maintaining an images database, by providing image classification tags for images stored in the images database. As yet another application, the image classification system 70 finds application in image content analysis. For example, the image classification system 70 can be applied to portions of images to identify content portions. As an example, pattern recognition can be used to identify animals in images, and image portions identified as showing animals are then processed by the image classification system 70 to identify which animal is shown in each image portion.

The classifier of FIG. 5 has been implemented as software executing on a 2.4 GHz Opteron™ computer with 4 gigabytes of RAM, and applied to classifying actual images. In a first test, the image classification system 70 as shown in FIG. 5 was applied, but using a general visual vocabulary only, rather than a plurality of class visual vocabularies. The best results using the general visual vocabulary were obtained with a vocabulary size of 8 visual words. These results are set forth in Table 1 for gradient vector $V_c$ limited to gradient components of various parameter types.

TABLE 1

| results using general vocabulary only | |
|---|---|
| $V_c$ gradient components | Image classification accuracy |
| $w_n$ only | 13.7% |
| $\mu_n(d)$ only | 42.3% |
| $\sigma_n(d)$ only | 50.8% |
| $\mu_n(d)$ and $\sigma_n(d)$ only | 56.7% |
| All of $w_n$, $\mu_n(d)$, and $\sigma_n(d)$ | 56.8% |

In a second test, the image classification system 70 as shown in FIG. 5 was applied using class visual vocabularies $\lambda_c$ 30 that merge general and class-specific visual words in accordance with the method shown in FIG. 1. The best results using these class visual vocabularies were obtained with a vocabulary size of 32 words in each of the general and class-specific vocabularies (and hence 64 words in the class visual vocabulary that concatenates the general and class-specific visual vocabularies). The results are set forth in Table 2 for gradient vector $V_c$ limited to gradient components of various parameter types.

TABLE 2

| results using class vocabularies that concatenate general and class-specific visual words | |
|---|---|
| $V_c$ gradient components | Image classification accuracy |
| $w_n$ only | 45.8% |
| $\mu_n(d)$ only | 54.7% |
| $\sigma_n(d)$ only | 58.8% |
| $\mu_n(d)$ and $\sigma_n(d)$ only | 63.7% |
| All of $w_n$, $\mu_n(d)$, and $\sigma_n(d)$ | 63.7% |

In a third test, the image classification system 70 as shown in FIG. 5 was applied as in the second test, but using a vocabulary size of 64 words in each of the general and class-specific vocabularies (and hence 128 words in the class visual vocabulary that concatenates the general and class-specific visual vocabularies). The results using these larger class vocabularies were similar to the results for the smaller vocabulary shown in Table 2. However, the computational cost using the larger vocabulary was substantially greater than the computation cost using the smaller vocabulary.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for classifying an image, the method comprising:

extracting model fitting data for the image respective to a generative model that includes parameters relating to visual words of at least an image class-specific visual vocabulary;

computing a higher-dimensionality representation of the model fitting data that includes at least some components of a gradient of the model fitting data in a vector space defined by the parameters of the generative model;

repeating the extracting and computing for a plurality of generative models each having at least a different image class-specific vocabulary corresponding to a different class of images; and classifying the image based on the higher-dimensionality representations;

wherein the extracting, computing, repeating, and classifying operations are performed by a computer.

2. The method as set forth in claim 1, wherein the generative model further includes parameters relating to visual words of a general visual vocabulary.

3. The method as set forth in claim 2, further comprising:

deriving the general visual vocabulary from a set of training images;

adapting the general visual vocabulary to a selected image class sub-set of the training images to generate each image class-specific visual vocabulary; and forming each generative model at least in part by merging the general visual vocabulary and the corresponding image class-specific visual vocabulary.

4. The method as set forth in claim 1, wherein the extracting of the model fitting data comprises:

extracting a features vector from each of a plurality of key-patch regions of the image to define a set of feature vectors;

computing a likelihood of the set of feature vectors respective to the generative model; and computing a logarithm of the likelihood.

5. The method as set forth in claim 4, wherein the computing of the higher-dimensionality representation comprises:

computing at least some components of the gradient of the logarithm of the likelihood scaled by a count of the feature vectors in the set of feature vectors.

6. The method as set forth in claim 1, wherein the computing of the higher-dimensionality representation comprises:

computing a sub-set of the components of the gradient of the model fitting data in the vector space defined by the parameters of the generative model.

7. The method as set forth in claim 1, wherein the generative model is a Gaussian mixture model including at least a weighting parameter, a features vector mean parameter, and a features vector covariance parameter corresponding to each visual word of the generative model.

8. The method as set forth in claim 7, wherein the computing of the higher-dimensionality representation comprises one of:

computing components of the gradient along only dimensions of the vector space defined by the mean parameters of the generative model;

computing components of the gradient along only dimensions of the vector space defined by diagonals of the covariance parameters of the generative model;

computing components of the gradient along only dimensions of the vector space defined by mean parameters of the generative model and by diagonals of the covariance parameters of the generative model; and computing components of the gradient along dimensions of the vector space defined by weighting parameters of the generative model and defined by mean parameters of the generative model and by diagonals of the covariance parameters of the generative model.

9. The method as set forth in claim 1, wherein the parameters of the generative model include at least one multi-dimensional vector parameter with dimensions corresponding to dimensions of a features vector characterizing the image, and the computing of the higher-dimensionality representation comprises:

computing components of the gradient of the model fitting data along the dimensions of the at least one multi-dimensional vector parameter.

10. The method as set forth in claim 9, wherein the multi-dimensional vector parameter has dimensionality D corresponding to the D dimensions of the features vector characterizing the image, the generative model contains N visual words, and the computed higher-dimensionality representation has dimensionality greater than N×D.

11. The method as set forth in claim 1, further comprising:

whitening the higher-dimensionality representations of the image prior to the classifying.

12. An image classification system comprising:

a plurality of generative models corresponding to a plurality of image classes, each generative model embodying at least an image class-specific visual vocabulary; and a digital processor programmed to embody:

a gradient-based class similarity modeler including (i) a model fitting data extractor that generates model fitting data of an image respective to each generative model and (ii) a dimensionality enhancer that computes a gradient-based vector representation of the model fitting data with respect to each generative model in a vector space defined by the generative model, and an image classifier that classifies the image respective to the plurality of image classes based on the gradient-based vector representations.

13. The image classification system as set forth in claim 12, wherein each generative model embodies a merger of a general visual vocabulary and an image class-specific visual vocabulary.

14. The image classification system as set forth in claim 12, wherein each generative model has dimensionality of at least N×D where N is a count of vocabulary words and D is a number of features in features vectors characterizing the image, and the gradient-based vector representation computed by the dimensionality enhancer has dimensionality of at least N×D.

15. The image classification system as set forth in claim 12, wherein (i) the model fitting data extractor generates a comparison of the image with each generative model that incorporates a conditional likelihood of a set of feature vectors characterizing the image respective to the generative model, and (ii) the dimensionality enhancer computes the gradient-based vector representations as gradients of the conditional likelihoods respective to at least some parameters of the generative models.

16. A method for classifying an image, the method comprising:

extracting model fitting data for the image respective to a generative model embodying a merger of a general visual vocabulary and an image class-specific visual vocabulary;

increasing a dimensionality of the model fitting data by computing derivatives of the model fitting data in a vector space defined by parameters of the generative model;

repeating the extracting and increasing for a plurality of generative models each embodying a merger of the general visual vocabulary and a different image class-specific vocabulary for a different image class; and classifying the image based on the increased-dimensionality model fitting data;

wherein the extracting, increasing, repeating, and classifying operations are performed by a digital processor.

17. The method as set forth in claim 16, further comprising:

deriving a general visual vocabulary from a set of training images;

adapting the general visual vocabulary to a first selected sub-set of the training images associated with a first class to generate a first image class-specific visual vocabulary;

merging the general visual vocabulary and the first image class-specific visual vocabulary, the generative model for the first class embodying the merger of the general visual vocabulary and the first image class-specific visual vocabulary; and repeating the adapting and merging for each class to construct the generative models for the plurality of classes.

18. The method as set forth in claim 16, wherein the increasing comprises:

for one or more parameters of the generative model, computing a derivative for each feature of a features-based representation of the image.

19. The method as set forth in claim 16, wherein each generative model has parameters $p_{n,j}(d)$ where index n denotes a visual word, the index j denotes a parameter type, and index d denotes a feature dimension of the features-based representation, and the increasing of dimensionality comprises:

computing n×d derivatives of the model fining data respective to at least one parameter type j.

20. The method as set forth in claim 19, wherein each generative model is a Gaussian mixing model, and the parameter types indexed by the index j include weighting, mean, and covariance parameter types for each visual word n.

* * * * *